United States Patent [19]

Dahlstrom

[11] 4,342,638

[45] Aug. 3, 1982

[54] FLASHED-DOWN RESIDUE TREATMENT INCLUDING FILTERING AND SOLVENT REPULPING

[75] Inventor: Donald A. Dahlstrom, Salt Lake City, Utah

[73] Assignee: Envirotech Corporation, Menlo Park, Calif.

[21] Appl. No.: 221,406

[22] Filed: Dec. 30, 1980

Related U.S. Application Data

[63] Continuation of Ser. No. 25,757, Apr. 2, 1979, abandoned.

[51] Int. Cl.³ .......... C10G 1/04

[52] U.S. Cl. .......... 208/8 R; 208/8 LE; 208/177; 210/769; 210/770; 210/772; 210/774; 210/806; 585/800; 585/833

[58] Field of Search .......... 208/8 LE, 177, 8 R; 210/189, 202, 203, 205, 208, 217, 224, 253, 255, 259, 297, 319, 330, 340, 341, 769, 770, 772, 774, 806; 196/14.52, 46.1; 585/800, 833

[56] References Cited

U.S. PATENT DOCUMENTS

| | | | |
|---|---|---|---|
| 1,774,044 | 8/1930 | Sweetland | 210/77 |
| 1,864,856 | 6/1932 | Pier et al. | 208/8 LE |
| 2,058,944 | 10/1936 | Bailey et al. | 208/30 |
| 2,422,373 | 6/1947 | Smith | 210/217 |
| 2,454,124 | 11/1948 | Birsch et al. | 210/340 |
| 2,561,812 | 7/1951 | Morell et al. | 210/66 |
| 2,956,944 | 10/1960 | Logan et al. | 210/67 |
| 3,598,717 | 8/1971 | Sunagel et al. | 208/8 |

FOREIGN PATENT DOCUMENTS

| | | | |
|---|---|---|---|
| 1046946 | 1/1979 | Canada | 210/66 |

*Primary Examiner*—David R. Sadowski
*Attorney, Agent, or Firm*—Robert R. Finch

[57] ABSTRACT

An apparatus arrangement and method of operation for treatment of the residue from a coal liquifaction and hydrogenation reactor, which residue contains 5% to 10% solids and is at elevated temperature (f.i. above 700° F.) and pressure of 150–200 psi. Said apparatus comprising a continuous pressure precoat filter sealed against pressure loss, a sealed repulper associated with said pressure filter for repulping filter cake in relatively cooler solvent while maintaining the pressure thereon at abou. 00 lbs/in.² to yield a slurry, then utilizing the press. to force the slurry into and through a second pressure filter wherein to effect liquid solids separation; and separately discharging the filtrate and cake from the second filter.

1 Claim, 1 Drawing Figure

FLASHED-DOWN RESIDUE TREATMENT INCLUDING FILTERING AND SOLVENT REPULPING

This is a continuation, of application Ser. No. 025,757, filed Apr. 2, 1979, abandoned.

FIELD OF THE INVENTION

This invention relates generally to the liquifaction and/or hydrogenation of coal to recover hydrocarbons, fuels and other liquid products therefrom. More particularly, the invention relates to improved ways and means for more efficient treatment of the flashed-down residue from such liquifaction.

In a typical coal liquifaction and/or hydrogenation process as heretofore practiced, ground coal is dissolved in a solvent, usually derived from the coal itself, then hydrogenated at very high temperatures and pressures. Following this, the mass passes through several stages during which products are recovered while the temperature and pressure are reduced. The resulting flashed-down residue contains 5% to 10% solids, some of which have heat value and the residual liquid still contains valuable dissolved materials. The flashed-down fraction is still at elevated temperature (f.i. above about 700° F.) and at a pressure in the range of 150–200 psi. Recovery of values a pressure in the range of 150–200 psi. Recovery of values from this fraction is achieved by filtering to separate the solid residue from the solvent. The filtrate, which contains dissolved products, may be sent to further process while the solid residue is either further treated or otherwise conserved to recover heat value.

Although such prior methods for handling the flashed-down residue are workable, they still present several distinct disadvantages. This is primarily because, from a practical standpoint, it is impossible to maintain a seal on a continuous pressure filter while discharging dry cake therefrom. If the cake is repulped under pressure then discharged through conventional metering valves, there is extreme wear on the valves thus increasing costs of operation. Moreover, there is still the cost of final separation of residual solids and solvent in order to clean the solids and recover additional products.

SUMMARY OF THE INVENTION

It is the primary object of this invention to provide improved ways and means for processing of the flashed-down residual fraction from coal liquifaction and/or hydrogenation to separate and recover the valuable dissolved constituents as well as valuable residual solids without pressure or heat.

A further object is the processing of the residual fraction coal as aforementioned under conditions whereby the processing includes two pressure filtration steps, the second of which acts as a valve through which repulped cake from the first pressure filter is discharged.

An important related object is provision of a system in which temperature on the first stage filter cake is reduced by repulping said cake in a fresh relatively cooler solvent to yield a filterable slurry then utilizing the pressure to force said slurry into and through a second filter wherefrom cake and filtrate are separately discharged to substantially atmospheric pressure. Since the temperature has been reduced prior to pressure release, flashing is also reduced. Also, the solvent in which the cake is repulped is selected to minimize flashing.

Briefly, the foregoing, and possibly other objects, are achieved by the steps of maintaining a slurry of flashed-down residue from a coal liquifaction and/or hydrogenation process in a pressure vessel at an elevated temperature, say above 700° F., and a pressure in the range from 150–200 psig; filtering the slurry on a continuous pressure filter to separate the solid and liquid fractions to yield a filtrate that is discharged to further processing and a filter cake, maintaining the pressure on the cake while cooling it to about 300° F. by repulping it with a cool solvent in a repulper maintained at said pressure of 150–200 psig, thereafter filtering the resulting slurry on a second pressure filter by utilizing the existing pressure of the first filter both to effect transfer of the slurry to the second filter and expression of filtrate therethrough whereby to yield a filter cake and a clear filtrate. The filtrate is continuously discharged, via suitable metering valves, to atmospheric pressure. Since the second filter is a batch type, it must be opened periodically for cake removal.

Suitable valves and conduits are provided for isolating the first and second filters from each other and to direct pressured slurry from the first to second filters as needed. Typically, a flow control valve operation at a 5–10 psi pressure drop will be used to regulate flow from the repulper to the second filter. Also, suitable metering valves are employed, as needed, for reducing the filtrate from both filters to atmospheric pressure.

So far as the filter cake is concerned, there is no significant pressure drop in the first filter between the filter inlet and outlet from the repulper. hence, a continuous filter, such as a rotary drum pressure precoat filter may be employed. (Obviously, there must be some pressure drop across the filter to effect cake formation and filtrate discharge, but this will not affect the pressure on the cake either on the drum or in the repulper.) The cake repulper is located in the same confined zone or tank as the filter, but is somewhat isolated, as by a chute, from the filter feed tank to avoid cooling of the filter feed and cake prior to discharge. In the repulper, the cake is thoroughly mixed with a relatively cooler solvent to extract additional values while cooling the solids to about 300° F. to minimize flashing following the second filter. The resulting slurry is then forced by the existing pressure into and through the second filter, which, as noted is a batch type, such as a plate and frame, from which filtrate is continuously discharged and the cake periodically discharged at atmospheric pressure.

By keeping the mixture at an elevated temperature and pressure until completion of the first filtration stage, maximum recovery of the lower boiling point products is achieved. Use of a relatively cooler, lighter solvent in the repulping stage effects recovery of other valuable products such as asphaltines and heavy oils while reducing the temperature to minimize flashing upon completion of the second filtration step when the pressure on the cake and filtrate is reduced to atmospheric.

In summary, the first filter is maintained at elevated pressure and temperature, the cake repulper effects temperature reduction and the second filter, which is located to accept the slurry from the repulper acts as a valve enabling final pressure reduction with minimum flashing concomitantly with separation of the residual solids and filtrate, thus making maximum use of the existing pressure and temperature in the residual fraction.

In order that the invention may be more readily understood and carried into effect, reference is made to the accompanying drawings and the description thereof which are to be taken as illustrative and not in limitation of the invention, the scope of which is defined only by the appended claims, including equivalents, rather than by the drawings or other description thereof.

Figure 1:
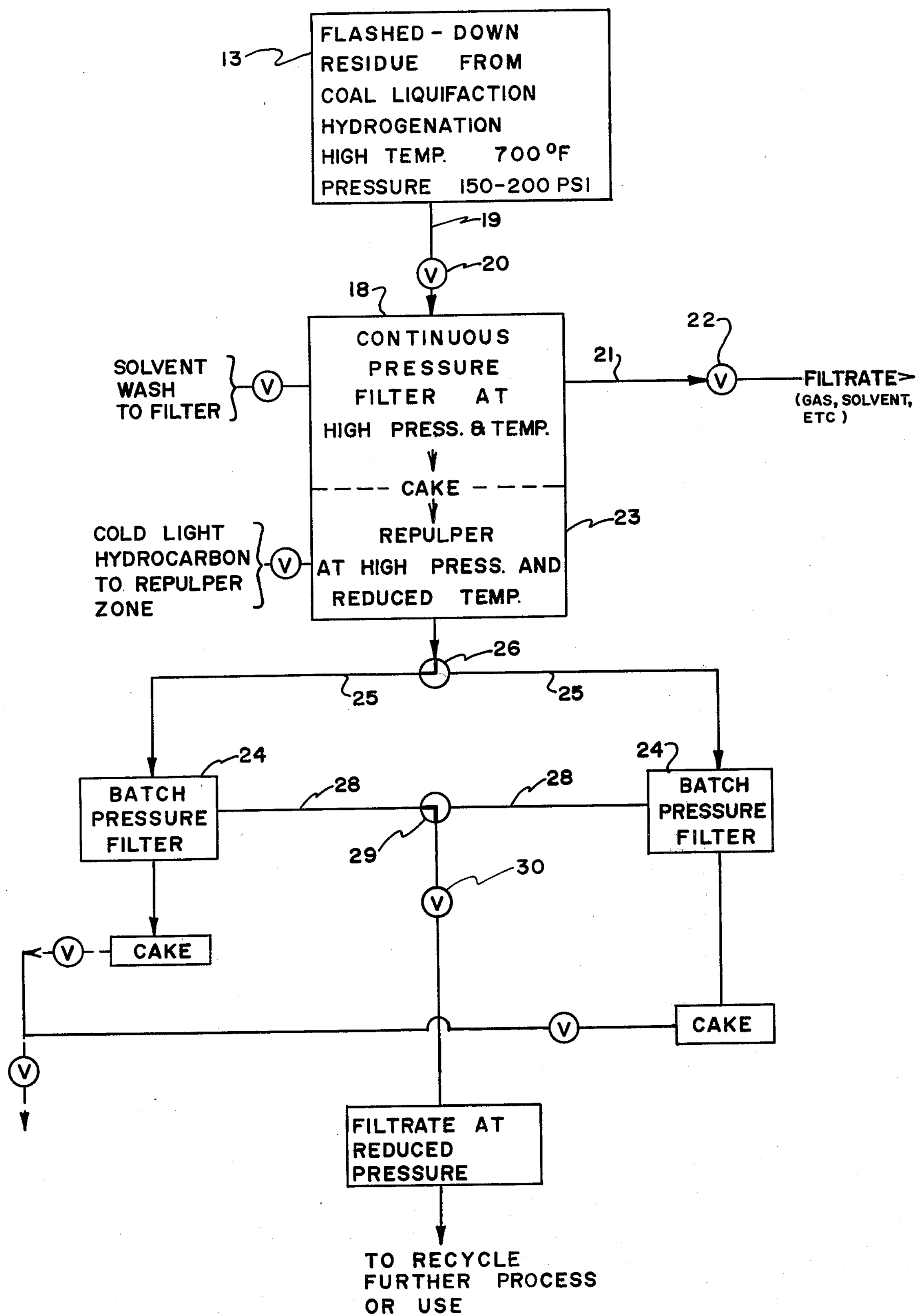
FIG. 1 is a flowsheet illustrating the various steps of the process. The actual equipment is not described in detail because it is well known in the field.

Storage tank 13 contains a supply of flashed-down residue from a coal liquifaction process. Typically, this is a slurry containing up to 10% solids part of which still contain heat value. The liquid fraction a solvent and contains valuable dissolved constituents. The residue slurry in the storage vessel is at an elevated pressure in the range from 150–200 psig and a temperature above about 700° F.

Slurry from the storage vessel 13, still maintained at elevated pressure and temperature, is flowed to a first filter 18, which is a sealed continuous precoat filter, via conduit 19 at a rate controlled by a suitable metering valve 20. Filtrate is discharged via a suitable conduit 21 and valves 22 while the cake is discharged into a repulper 23. In the repulper, the pressure remains substantially that of the filter shell, however, the cake temperature is reduced by the introduction of relatively cooler wash solvent, some of which might be used as wash on the filter, but the majority of which is added to the cake in the repulper. The temperature reduction in this step is important because this will lessen flashing of the solvent upon discharge from the subsequent filtration step—either as filtrate or residual solvent in the cake.

The second filtration step is carried out in one or more batch type pressure filters 24 to which the slurry is transferred from the repulper under the influence of pressure therein, via conduit 25 at a rate controlled by three-way valve 26. The valve 26 will, in accordance with known practice, be associated with controllers to regulate flow from the repulper so as to maintain a relatively constant pressure in the first filter. This valve may also be made responsive to changing pressure drop across the batch filter to regulate feed in response thereto. Filters 24 may, as indicated, be batch filters from which the filtrate is continuously discharged via conduits 28 and three-way valve 29 at reduced (atmospheric) pressure while the cake, as is customary in batch filters, is periodically removed when the entire filter is depressurized to atmospheric pressure. By using a pair of second filters, the process may be conducted continuously simply by alternating the filters on-stream.

As indicated, filtrate from both filters as well as the final cake, may be recycled or sent to other process as desired.

The critical feature of the invention is the use in combination of a pressured repulper in which temperature reduction of the cake is obtained by adding cool solvent and a second filter which functions as a valve for final reduction of the pressure on the cooler repulped slurry concomitantly with separation of the solvent with valuable components from the residual solids. Use of the filter as a valve eliminates the need for a metering valve. At the same time, final product separation is achieved.

The continuous pressure filter is preferably a rotary drum precoat type as that is one which gives a clear filtrate under conditions described while the batch filters may be the well known plate and frame filters.

I claim:

1. In a method for treating a flashed-down residue from a reaction zone of a coal liquifaction process which residue is a slurry of residual solids in a liquor containing dissolved hydrocarbons and is at an elevated temperature of about 700° F. and a pressure in the range from 150–200 psi, the improvement comprising feeding said slurry to a first filter zone that contains both a filter and a repulper and is maintained at substantially the same pressure and temperature as said slurry, filtering said slurry on the filter in said first zone to yield a filter cake of solids and a filtrate, separately discharging said cake and filtrate from said filter, discharging filtrate from said filter zone, reducing the temperature of said cake by repulping it with a relatively cooler solvent in a repulper subjected to the pressure of said filter zone to yield a slurry, transferring the slurry from said repulper in said filter zone under the influence of pressure therein through a closed conduit to a second pressure filter wherein said pressure effects filtration of said slurry to yield a cake and a filtrate; and separately discharging said cake and said filtrate from said second filter to zones of substantially reduced pressure.

* * * * *